United States Patent [19]
Lecrivain

[11] Patent Number: 6,151,944
[45] Date of Patent: Nov. 28, 2000

[54] ROLLING INSTALLATION FOR FLAT PRODUCTS

[75] Inventor: Alain Lecrivain, Combs la Ville, France

[73] Assignee: Vai Clecim, Courebvoire, France

[21] Appl. No.: 09/402,463

[22] PCT Filed: Feb. 12, 1999

[86] PCT No.: PCT/FR99/00322

§ 371 Date: Dec. 3, 1999

§ 102(e) Date: Dec. 3, 1999

[87] PCT Pub. No.: WO99/41026

PCT Pub. Date: Aug. 19, 1999

[30] Foreign Application Priority Data

Feb. 13, 1998 [FR] France .................................. 98 01784

[51] Int. Cl.[7] .................................................. B21B 13/14
[52] U.S. Cl. ...................................... 72/241.6; 72/241.2
[58] Field of Search ............................... 72/241.4, 241.6, 72/241.8, 242.2, 245, 240, 243.2, 243.4, 243.6, 238, 239

[56] References Cited

U.S. PATENT DOCUMENTS

| | | |
|---|---|---|
| 2,106,866 | 2/1938 | Best . |
| 3,355,924 | 12/1967 | Sendzimir . |
| 4,206,700 | 6/1980 | Stotz et al. . |
| 4,480,452 | 11/1984 | Schnyder . |
| 4,625,637 | 12/1986 | Pav et al. ................................. 72/241.6 |
| 4,882,922 | 11/1989 | Dominique ................................. 72/245 |
| 4,936,207 | 6/1990 | Niskanen et al. ....................... 72/241.6 |
| 4,989,431 | 2/1991 | Stotz ...................................... 72/241.6 |

FOREIGN PATENT DOCUMENTS

| | | |
|---|---|---|
| 2 523 879 | 9/1983 | France . |
| 91/04108 | 4/1991 | WIPO . |

*Primary Examiner*—Rodney A. Butler
*Attorney, Agent, or Firm*—Arent Fox Kintner Plotkin & Kahn, PLLC

[57] ABSTRACT

A metal band product rolling installation comprising at least two rolls with parallel axes inside a fixed holding stand (1) having two separate standards (11a, 11b) each forming a closed frame comprising two stiles (12 12'), an upper crossbeam (16) and a lower crossbeam (16'), and delineating a center window (6), at least one of the rolls being a back-up roll (3), carried by two supporting parts (4a, 4b) each resting on a back-up face (63) of the corresponding crossbeam (16 16') of each standard (11a, 11b). According to the invention, at least on one side of the rolling plane (T1), the crossbeam (16) of each standard (11a, 11b) is fitted with a back-up face (63) exhibiting, over the whole width of the window (6), a concave rounded profile extending on an angular sector of at least 180° and the supporting part (4) of each end head (35a, 35b) of the back-up roll (3) rests on the said crossbeam (16) via a back-up part (42) delineated by a contact face (41) with a convex rounded profile matching that of the back-up face (63).

17 Claims, 4 Drawing Sheets

ROLLING INSTALLATION FOR FLAT PRODUCTS

The invention relates to a flat product rolling installation and applies especially to the hot or cold rolling of a metal band or sheet.

The invention also covers the implementation process of such a rolling installation.

A roll mill generally consists of a fixed stand with two separate standards linked by a spacer and between which are provided several superimposed rolls with parallel axes, respectively two working rolls defining a passage gap for the product and one or several back-up rolls.

In the so-called trio stands, a single back-up roll is used for a small diameter working roll, whereas the other working roll is of sufficient diameter to resist intrinsically to the loads applied.

Conversely, the so-called stands are symmetrical and comprise two working cylinders resting respectively on the side opposite to the gap, each on a larger diameter back-up roll.

Quinto or sexto stands are also known, in which an intermediate roll is interposed between a working roll and a corresponding back-up roll.

Finally, in so-called <<Z-High>> stands, which are of the sexto type, each working roll is connected to two side bearing assemblies, called inserts, arranged on either side of the working roll, in the space provided between the said working roll and the periphery of the related intermediate roll.

In all cases, the roll stands are designed to hold all the rolls (back-up, working, intermediate rolls, . . . ) in a vertical clamping plane containing their axes and more or less perpendicular to the horizontal rolling plane of the product, also called <<passing line>>.

In so-called reversible stands, the product circulates in both directions, whereas roller tables are provided on either side of the stand. In so-called tandem mills, the product forms a continuous band that passes successively through several roll stands, each reducing the thickness of the product.

It is necessary to adjust the relative levels of the rolls in order to set the level of the rolling planes and the thickness of the gap.

Usually, in a conventional roll stand, each roll is mounted to rotate on a shaft whose both ends constitute, each, a journal revolving in a bearing housed in a supporting part, called a chock. To enable height-adjustment of the rolls, the chocks are mounted to slide in windows provided respectively in both standards of the stand, along guiding faces, which are parallel to a clamping plane going through the roll axes.

The level of the rolling plane is normally determined by that of the lower back-up roll, which rests, at its ends, on fixed or thickness-adjustable shims.

Balancing jacks resting on the chocks of the working rolls regulate their relative levels in order to determine the thickness of the gap and enable, moreover, placing the rolls at the level of the fixed disassembly rails.

Other balancing jacks, resting on the chocks of the upper back-up roll enable adjusting the level of the said upper roll between a disassembly position for which the rolls can be moved apart from one another and the rolling position determined by the clamping means resting on the standards.

Since the diameter of the working rolls is smaller than that of the back-up rolls and since their chocks are also smaller, the guiding faces of the working rolls are closer to one another than those of the back-up rolls. In a quarto roll mill, for instance each window consists of a rectangular aperture whose width corresponds to the chocks of the back-up rolls and extending over the whole height occupied by the rolls, and the guiding faces of the chocks of the working rolls are provided on protruding sections directed to the inside of the window.

Generally, the product to be rolled having an initial thickness is passed between both working rolls whose spacing is less, in order to determine a reduction of the initial thickness by rolling the product. Both working rolls tend therefore to move apart from one another and each rests upon a larger diameter back-up roll, whose level is maintained by clamping means, for instance of a screw/nut or hydraulic jack type, said clamping means resting on one side on the corresponding standard and on the other side, on the supporting chocks of the back-up rolls. These chocks are therefore mounted to slide in a window of the standard, whose shape is that of a rectangular frame comprising two vertical stiles, an upper crossbeam and a lower crossbeam.

The rolling load, tending to move the rolls apart and taken by both standards of the stand, can be extremely high when rolling a metal band and may reach, for instance several thousand tons.

As this roll load is applied to the ends of the back-up rolls, the latter tend to flex and consequently, a thickness variation appears transversally to the passing direction, which must be compensated for.

Before, the back-up rolls were conferred a bulged profile but, recently, it has been suggested to impart a bending load to the working rolls, either in a positive direction to move their ends apart from one another or in a negative direction to bring them closer. To this end, bending jacks are normally used, resting in the positive direction or in the negative direction, on the chocks of the working rolls and which are housed, normally, in the protruding sections of the window, used for guiding the chocks and which constitute hydraulic blocks.

It is thus possible, if needed, to modify the distribution of the loads imparted to the product in order to correct the flatness defects detected downstream.

The same jacks can be used to impart the bending loads and to adjust the relative levels of the working rolls.

It has also been suggested, to correct flatness defects, to use a back-up roll of rotary casing type, comprising a tubular casing mounted to rotate round a fixed central shaft and resting upon the said shaft via a number of pads whose radial position can be adjusted individually in order to compensate for the deflection of the shaft and to correct the distribution of the loads over the related working roll.

But the application of a very high load on each standard of the stand can also determine a yielding effect of the latter and even deform the window.

In modern mills, we know means enabling to determine the yielding effect of the stand in relation to the rolling load and, consequently, to take the said yielding effect into account during the various adjustments in order to guarantee the reduction of thickness requested.

Conversely, until now, we did not know any means avoiding deformation of the stand standards, each forming a closed ring to resist, in good conditions, to the loads applied.

Indeed, since the window must show a minimal width to house the chocks of the rolls and since the screws or clamping jacks rest at the centre of each crossbeam in the medium plane, there is a certain deflection of the crossbeam which causes both vertical stiles of the standard to come slightly closer to one another.

It is therefore necessary to provide sufficient play to avoid excessive friction, let alone seizing of the chocks inside the windows.

To limit the risks of deformation of the stand under the rolling load, very large stands had to be designed, consisting of steel parts, some of which may exceed 100 tons in weight and are therefore very difficult to be cast and to handle for machining purposes. For instance, for a roll mill capable of imparting a 3000-ton rolling load, the section of each stile may reach 7000 cm$^2$.

Thanks to the use of hydraulic clamping systems associated with measuring means and to electric or electronic controls enabling to compensate for the elongation of the table under stress, it is possible to reduce the section of the stiles, with equal stress, while reducing the tightening of the window. This effect, however, cannot be totally avoided and the resulting frictions counteract the vertical displacement of the chocks and cause a hysteresis phenomenon in the thickness regulation of the rolled product thus degrading the thickness tolerances.

Moreover, we know that the rolls of a mill wear relatively rapidly and must be remachined. It is therefore necessary, periodically, to remove certain rolls for maintenance and replacement, when the wear has become too significant or, in the case of the working rolls, when their diameter must be modified significantly to suit another rolling programme.

A roll is extracted from or inserted into the stand by moving the roll along its axis. To this end, the roll to be replaced must first of all be pulled away vertically from the adjacent rolls in order to prevent frictions, then it is moved horizontally on rails placed at constant level.

Besides, modifying their relative levels must also compensate for the diameter variations of the rolls.

Usually, all the rolls of a stand are thus mounted as movable, along both standards, between a clamping position for which the working rolls are separated by a distance corresponding to the requested gap and a disassembly position for which the rolls are pulled away from one another.

Generally, in a quarto or sexto, the working rolls rest on top of one another and are replaced in pairs, whereas the back-up rolls are replaced one after another, after having removed the other rolls and inserted intermediate supporting parts.

Normally, the level of the upper back-up roll is adjusted by the clamping means mounted on the standard whereas the chocks of the lower back-up roll rest on shims whose level can be advantageously set between a raised position which determines the level of the rolling plane and a lower position for disassembly. The level of the working rolls can be adjusted using the bending jacks, which rest either directly on the stand or on the chocks of the lower back-up roll.

Still, the complexity of modern installations and, in particular, the presence of the chocks and of the related bending devices multiplies the manoeuvres necessary to disassembly and lengthens the intervention times while shortening the production time accordingly.

The invention relates to a new type of mill, which enables solving ideally all the problems, which have just been mentioned, and exhibits event more advantages. In particular, the invention enables to reduce the risks of deformation of the stand and, consequently, to make it lighter. Moreover, the invention enables to simplify considerably the execution of the stand, which carries the rolls, to eliminate certain auxiliary members and to facilitate the adjustment and replacement operations of the rolls, whereas the execution of such an installation is significantly cheaper.

The invention therefore applies, generally speaking, to a rolling installation for a metal band product, consisting of a fixed supporting stand with two separate standards, each forming a closed frame comprising two stiles, an upper crossbeam and a lower crossbeam, and defining a centre window, and at least two rolls with parallel axes defining a passage gap for the product following a rolling plane with the application, between the rolls, of a clamping load for rolling the product, whereas at least one of the rolls is a back-up roll for imparting the clamping load, the said back-up roll being mounted to rotate round its axis and carried by two opposite end heads, each mounted in a supporting part resting on the side opposite to the gap, on a back-up face of the corresponding crossbeam of each standard.

According to the invention, at least on one side of the stand, the crossbeam of each standard is fitted with a back-up face exhibiting, over the whole width of the window, a concave rounded profile extending on an angular sector of at least 180° and the supporting part of each end head of the back-up roll rests on the said crossbeam via a back-up section delineated by a contact face with a convex rounded profile matching that of the back-up face, in order to be inserted into the latter.

The invention especially applies to a mill of quarto or sexto type, comprising on either side of the rolling plane, at least two rolls, respectively a working roll revolving round a shaft fitted with two opposite journals, carried by chocks attached between two guiding faces parallel to the clamping plane going through the axes of the working rolls, and at least one back-up roll of larger diameter than that of the working roll.

In such a case, at least on one side of the rolling plane, the window of each standard of the stand comprises, on its end opposite to the rolling plane, a cavity delineated by a rounded face extending on an angular sector of at least 180° and a central section delineated by two sides on which have been provided parallel faces for guiding the chocks of the working roll.

Preferably, the concave back-up face of the crossbeam and the contact face of the supporting part exhibit a circular profile on a sector of at least 180°.

According to another particularly advantageous characteristic, the invention enables to simplify the removal and replacement process of the rolls and, in particular, of the back-up rolls, when the latter can be extracted from the stand by moving parallel to their axis.

Indeed, one of the standards of the stand, placed on the removal side, is fitted with a first cavity to accommodate a first supporting part of the roll, which goes through the said first standard completely, and exhibit, in all directions, as well as the said first supporting part exhibit, greater sizes than those of the back-up roll, in order to enable removal of the latter at least in one position of the latter with respect to the stand, by axial displacement of the said roll on the side of the said first standard, by going through the said first cavity whose sizes are greater.

Besides, the second roll supporting part opposite to the removal side and the corresponding cavity of the second standard of the stand exhibit, in all directions, sizes at least equal to those of the roll, whereas the latter is also extractable as a whole, with both its supporting parts, through the first cavity.

Particularly advantageously, a back-up roll is used, of the type comprising a revolving casing, mounted to rotate round a fixed supporting beam and resting on the latter via a number of back-up pads which are adjusted individually by jacks.

In such a case, the supporting parts of both end heads of the centre shaft are housed, each, in a cavity provided at one corresponding end of the window of the corresponding standard and delineated by a concave back-up face, whereas the said supporting part is enclosed, at least on the side opposite to the gap, with a supporting part delineated by a convex contact face matching the said back-up face of the cavity.

In such a lay-out according to the invention, the rolls can be clamped and their relative levels set, at least partially, by the individual adjustment means of the radial position of each pad, whereby the said means are controlled simultaneously in order to adjust and to keep at the requested level, the back-up generating line of the said casing on the corresponding working roll.

Preferably, the supporting parts of both end heads of the shaft of the roll rest, respectively, on the fixed back-up parts of both standards of the stand via width-adjustable means providing means to adjust the level of the roll in relation to the constant level determined by the fixed back-up parts of the windows of both standards.

For instance the supporting part of each end of the shaft can be fitted with an eccentric ring whose both circular faces are moved out of centre in relation to one another, respectively one internal face mounted on a cylindrical back-up face provided on the end head of the centre shaft and an external face mounted inside a cylindrical bore provided on the supporting part, whereas the angular position of the said ring in relation to the supporting part can be modified by rotation of the ring in order to adjust the level of the roll axis with respect to the supporting part.

In a lay-out even further enhanced, the adjustment means comprise, at each end of the roll, a set of two eccentric rings, mounted inside one another, and exhibiting two circular faces moved out of centre in relation to one another, respectively an internal ring mounted on the back-up head of the roll and an external ring mounted in a bore of the supporting part, whereas the relative angular positions of the said rings in relation to one another and with respect to the supporting part can be modified.

Thus, the adjustment of the respective angular positions of both rings with respect to the supporting part determines, by combining the eccentricities, the displacement of the axis of the cylindrical back-up face of the shaft inside a circle centred on the bore axis and with a radius equal to the sum of the maximum eccentricities of both rings.

The invention also covers other advantageous characteristics, which are presented in the sub-claims.

But the invention will be understood better by the following description of certain embodiments given for exemplification purposes and represented on the appended drawings.

The invention will be divulged, for exemplification purposes, within the framework of a roll mill of quarto type, but can be applied to any type of mill comprising at least one back-up roll with relatively large diameter.

Figure 1:
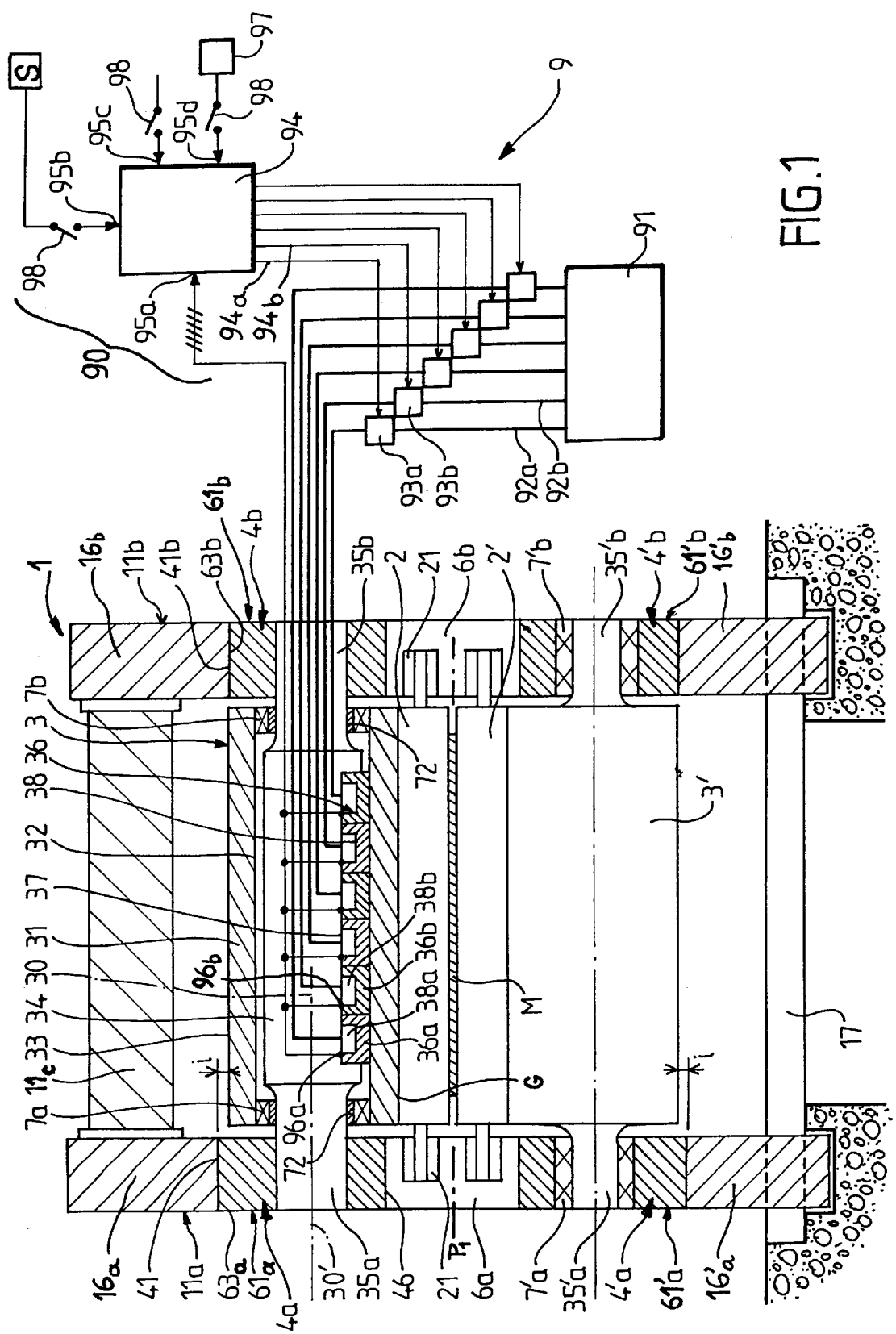
FIG. 1 is a schematic view, as a longitudinal section, of a roll stand according to the invention.

Generally speaking, such a mill comprises, as stated on FIG. 1, a fixed stand 1 exhibiting two separate standards 11a, 11b between which are provided four superimposed rolls, respectively two working rolls 2, 2' delineating a passage gap 15 of the product M along a rolling plane P1, and two back-up rolls 3, 3'. The roll axes are more or less parallel and placed in a clamping plane P2 that constitutes, normally, a medium plane of the stand.

Generally, the standards 11a, 11b are linked together at their upper part, by a spacer 11a, bolted on the inner faces of the standards which, at their lower part, rest on steel mouldings 17, bolted on the foundations.

Usually, each roll is mounted to rotate, at both its opposite ends, on journals revolving in bearings housed in chocks which are mounted in a window provided in each standard of the stand and, to enable the level adjustments while holding the roll laterally, the chocks are mounted to slide, each, between two guiding faces arranged on both sides of the window and parallel to the clamping plane P2 going through the axes of the working rolls. Consequently, each window exhibits usually a rectangular shape, whereas the standard makes up a closed frame comprising two vertical stiles, an upper crossbeam and a lower crossbeam.

Besides, the rolling load counteracting the separation of the rolls is applied by clamping means resting on the centre part of both crossbeams of the standard and to counteract the great loads exerted when rolling metal bands, it is necessary that the link between each end of a crossbeam and the corresponding stile operates as a nesting system. Therefore, in metal band mills, each standard consists, generally, of a single moulded part, in order to provide a closed ring of rectangular shape.

Figure 2:
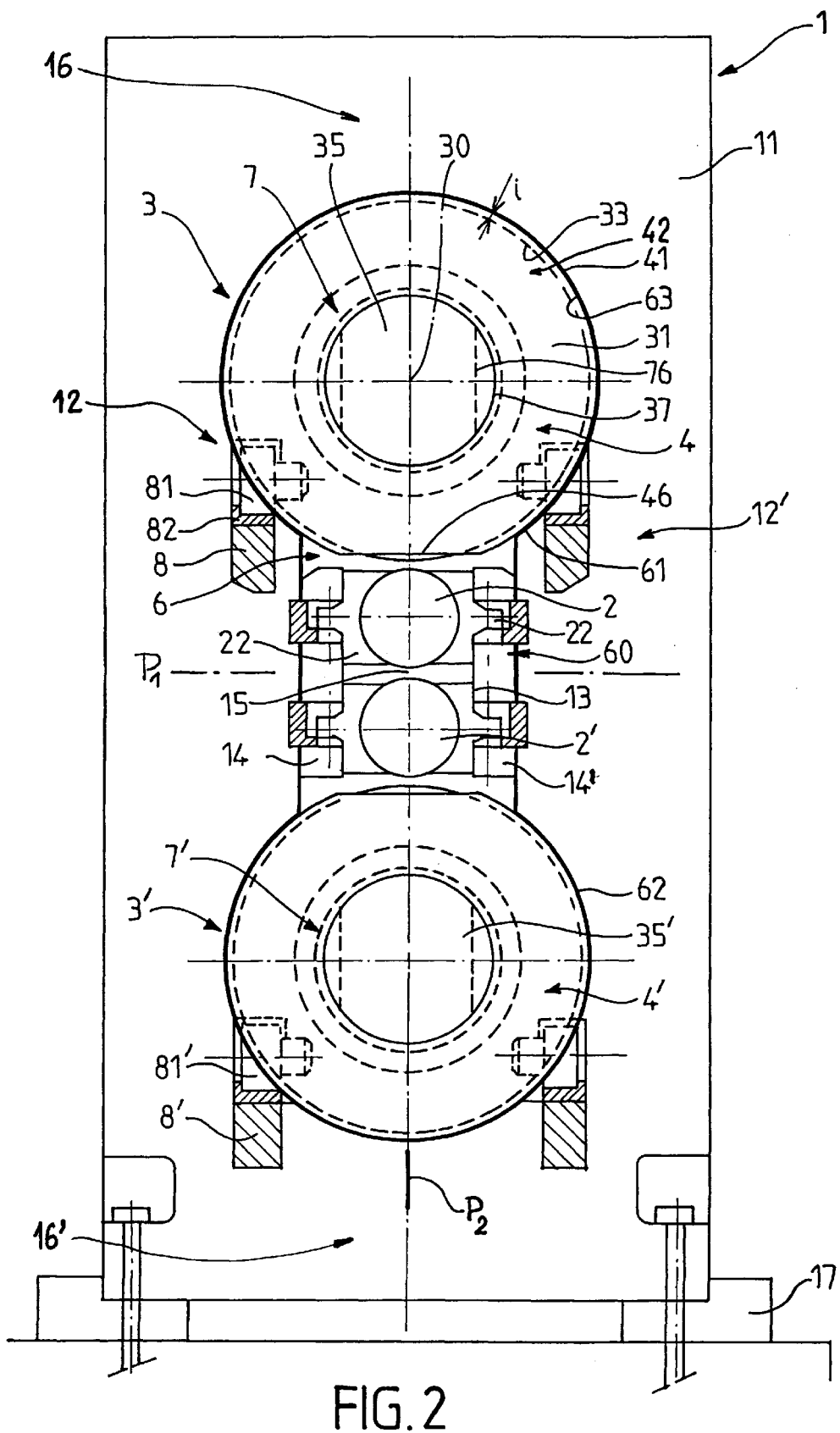
FIG. 2 is a side view of the stand.

In the invention, as shown on FIGS. 1 and 2, the shape of each standard 11a 11b is slightly different.

Indeed, when the working rolls 2,2' are as usual carried, at their ends, by chocks 21 mounted to slide, parallel to the clamping plane P2, along the guiding faces 13, conversely, the supporting parts 4a, 4b, 4'a, 4'b of both back-up rolls 3, 3' are simply housed in recesses 61, 61' each delineated, at least on the side opposite to the gap 15, by a concave rounded face 63, 63' extending over an angular sector of at least 180°.

Thus, each window 6 exhibits an oblong shape with a central section delineated by two parallel faces and two ends, each delineated by a semi-cylindrical face.

Since, as we have already seen, the guiding faces 13 of the working chocks 21 are usually provided on protruding sections extending towards each other, the internal faces 63, 63' of both recesses 61, 61' extend advantageously over a circular sector greater than 180°, as shown on FIG. 2, whereas the shape of each window is similar to that of a violin.

The supporting parts 4, 4' of both back-up rolls 3, 3' are connected to back-up parts whose shape matches that of the concave faces 63, 63' of both recesses 61, 61' in order to be inserted completely into the latter.

Consequently, the clamping load exerted between the back-up rolls 3, 3' during the rolling process is applied over the whole width of the crossbeam 16 of the window 11 and over a concave, preferably circular, surface extending over a circular sector of at least 180°. The nesting effect of the crossbeam 16 on both stiles 12, 12' is therefore not concentrated, as previously, in the corners of the window and the pressure applied by the supporting part 4 on the crossbeam 16 is distributed in all directions around the axis 30 of the roll.

The invention can be implemented in a mill comprising, as usual, clamping means such as a screw or a jack resting, on one side on the stand and on the other on the chocks of the back-up rolls. In such a case, each chock is associated with an intermediate back-up part, delineated by a convex face matching the concave face 63 of the recess 61 in order to engage into the latter, whereas the clamping means are interposed between this back-up part and the chock of the roll.

However, this intermediate part can advantageously be away with, whereby the supporting parts 4 of each back-up roll are then inserted directly into the recesses 61, 61' and rest at constant level on both standards of the stand.

In such a case, the clamping screws are not needed any longer and cannot be used any more to perform the height adjustments of the back-up rolls.

According to another essential characteristic of the invention, this height adjustment can be carried out while moving the roll itself. To this end, as shown on FIGS. 1 and 2, at least one of the back-up rolls, preferably the upper back-up roll 3, consists of a rotary casing roll of known type, comprising a centre shaft 34 in the form of an elongated beam, on which is mounted a tubular casing 31 with an internal face 32 and an external face 33 which are cylindrical and centred on a same axis 30.

The tubular casing 31 is maintained centred on its axis 30 by two bearings 7a, 7b, mounted respectively, each on an intermediate ring 72, installed on an end head 35a, 35b of the shaft 34.

When the rolls contact each other, the external face 33 of the tubular casing 31 rests on the corresponding working roll 2 along a common generating line G.

Besides, a number of adjacent pads 36 are provided, along the clamping plane P, between a back-up face 34' of the shaft 34 turned to the working roll 2 and the internal face 32 of the tubular casing 31.

In such a roll, the rolling loads exerted along the generating line G, during the rolling process, are taken by the centre shaft 34, via the pads 36 on which rests the tubular casing 31. To enable sliding rest, each pad 36 is fitted with an external face in the form of a circular sector of diameter more or less equal, within the clearance, to that of the internal face 32 of the casing 31 and forming a back-up cushion for the casing 31, whereas a lubricant is injected between the external face of each pad 36 and the internal face of the casing.

Moreover, each pad is movable radially along a direction perpendicular to the axis 30 of the casing 31 and is connected to means used for adjusting its radial position, means generally consisting of hydraulic jacks 38 resting on one side on the pad 36 and on the other on the back-up face 34' of the shaft 34.

The end bearings 7a, 7b serve essentially to hold the casing 31 transversally without disturbing its radial displacement. To this end, as shown on FIG. 3, each bearing 7 consists, conventionally, of an external stand 71 fixed in a bore provided at the end of the tubular casing 31 and an internal stand mounted on the intermediate ring 72, whereas roller elements 74, for instance conical rollers, are interposed between both stands. The bearing assembly is maintained by a stop 73 resting axially on the end 35 of the shaft 34.

Each end head 35a, 35b of the shaft 34 is delineated, normally, by a cylindrical face 37 centred on an axis 30' and, in order to enable radial displacement of the casing 31 in relation to the shaft 34 caused by the action of the pads 36, a play (a) is left between the internal face 72' of the intermediate ring 72 and the lateral face 37 of the end head 35 of the centre shaft 34. However, in order to hold the casing transversally without impeding radial displacement, the intermediate ring 72 is fitted, laterally, with two half-flats 76, represented schematically on FIG. 2, which slide along corresponding plane faces provided on both heads 35 of the shaft 34 and parallel to the clamping plane P in which are placed the axes of the rolls.

The relative position of the ring 72 supporting each bearing 7 with respect to the shaft 34 is adjusted by a balance jack 75 housed in a recess provided in the corresponding section of the head 35a, 35b of the shaft 34. Both jacks back-up respectively both bearings 7a, 7b enable therefore to determine the general level of the tubular casing 31 with respect to the shaft 34.

Usually when the adjustment jacks 38 of the pads 36 are single stroke jacks and push the casing 31 backwards to the working roll 2, the recall necessary to controlling the position of the casing is performed by the jacks 75.

Obviously, the rotary casing roll 3 used for the invention may benefit from all the enhancements made previously to the rolls of this type. In particular, the adjustment pads 36 should advantageously cover quite a large angular sector, for instance a quadrant or more, and be connected with oil circulation means causing a hydrodynamic lift effect.

As we have already shown, conventional mills have used rotary casing rolls of this type until now, to control the distribution of the loads along the back-up generating line G and the clamping load was applied at both ends of the shaft of the back-up roll by screws or a jack also serving to adjust the level of the roll.

Conversely, in a mill according to the present invention and unlike the usual lay-out, the centre shaft of the back-up roll 3 with rotary casing rests at constant level on both standards 11a, 11b of the stand 1, via supporting blocks 4a, 4b mounted respectively at both ends 35a, 35b of the shaft 34.

These end blocks may consist, as shown on FIGS. 1 and 2, of machined parts 4a, 4b which are simply inserted into the corresponding recesses 61a, 61b provided in the standards 11a, 11b and exhibiting a matching hollow shape.

As usual, the rotary casing roll 3 is connected to a hydraulic system 9 consisting of individual adjustment means, serving to adjust the position and the pressure of the jacks connected to each back-up pad 36 of the casing, and to adjust each pad in order to control the distribution of the loads, for instance, in relation to the flatness measurements taken on the rolled product, downstream of the mill.

According to the invention, the rotary casing roll 3 also enables to correct the load distribution, but fulfils essentially a new function. Indeed, since the centre shaft 34 rests at constant level on the stand, the clamping load and the level adjustment of the relative positions of the back-up rolls in the stand as well as of the thickness of the gap 15 between the working rolls 2,2' are produced by the set of back-up pads 36 which determine the displacement of the tubular casing 31 parallel to its own axis and, consequently, of the back-up generating line G with respect to a constant reference level determined by the recesses 61, 61'.

Controlled displacement of the tubular casing 31 parallel to its own axis, may indeed be provided by individual adjustment means of the radial position of each pad 36 which are controlled simultaneously.

The set of pads 36 constitutes, on the one hand, the main positioning means of the back-up roll 3 in order to adjust the levels of the rolls and, possibly, of the level of the gap 15 and, on the other hand, the application means of the clamping load between the working rolls 2, 2'.

The lower back-up roll 3' can thus be a rotary casing roll, as represented on FIG. 2, or a full roll.

In such an embodiment represented on the FIG. 1, the lower back-up roll 3' is carried by two journals 35'a, 35'b mounted to rotate in chocks 4'a, 4'b of fixed level, which are housed, as the bearing blocks of the upper back-up roll 3, in corresponding cavities 61'a, 61'b provided at the lower part of both standards 11a, 11b.

Thus, according to an essential characteristic of the invention, both back-up rolls rest at constant level on both standards of the stand and the clamping screws can thus be suppressed, as well as the sliding chocks provided usually to enable height adjustments of the back-up rolls.

Conversely, the working chocks 21a, 21b are, as usual, mounted to slide along guiding faces 13 parallel to the clamping plane P, which are provided advantageously on both hydraulic blocks 14, 14' fixed to both stiles 12, 12' of the standard 11 surrounding the window 6 and in which are housed jacks, not represented, serving to adjust the level and the bending of the working rolls 2, 2' which rest on lugs 22 provided on both sides of each chock 21 (FIG. 2).

Each standard 11a, 11b is thus fitted with an opening, reminding of a violin shape, comprising two rounded ends and a close centre section.

Each bearing block 4, 4' is thus surrounded by the back-up face 63 of the cavity 61, practically over its whole periphery and at least a 180° sector, i.e. up to areas which are diametrically opposed on which pressures are exerted horizontally.

Thus, in a roll stand according to the invention, the tightening effect which is produced, in conventional stands, between both stiles of the standard and liable to lock the chocks, has not to be taken into account. Indeed, possible tightening of the stiles will simply increase the seizing effect of the bearing blocks 4, 4' into the stiles, which is not important since no vertical displacement of these blocks is necessary. Moreover, this blocking counteracts the tightening of the stiles in their centre part, at the level of the working rolls 2, 2'.

Thus, the tightening effect is insignificant for the back-up rolls and much less than before for the working rolls. It is therefore possible to reduce the plays to be provided between the guiding faces 13 and the working chocks 21 to ensure vertical slide of the working rolls.

Usually, for instance, it is generally agreed to leave an average operating play of 1/1000 at the working chocks, between their vertical sliding faces and the corresponding guiding faces provided in the hydraulic blocks. Thanks to the invention, conversely, an average play of 0.3/1000 can be considered as sufficient.

Besides, better distribution of the loads enables to reduce the inertias of the constitutive parts of the stiles, which leads to saving material when constructing the standards of the stand whose weight can be halved.

A roll stand according to the invention will therefore be much cheaper than those of conventional design since no additional roll height adjustment device is necessary and since the weight of the standards has decreased considerably.

Besides, the construction of the stand standards is also simplified.

Indeed, usually, each standard of the stand consists of a rectangular framework, which has been cast as a single block and then machined very accurately to allow application of the guiding faces of the chocks which, usually, consisted of add-on parts.

According to the invention, conversely, the supporting blocks at the ends of the back-up rolls are completely inserted in the cavities of the standards and the pressure is distributed over their whole periphery. Moreover, there is no more guiding. It is therefore not necessary to machine with great accuracy the back-up faces 63 of the window 6 which can be simply cut using a blowpipe, whereas the standard may simply consist of a thick rolled sheet.

But the invention also enables to simplify considerably the devices necessary to disassembly and replacement of the rolls.

As we know, the surface condition of the working rolls can be deteriorated during rolling and the former must be finish-ground periodically. This implies that their diameter diminishes. The back-up rolls also wear, but they do not need to be machined so often.

In practice, the workshops contain several sets of working rolls or of back-up rolls in order to replace immediately the roll(s) that must be extracted from the stand for finish-grinding.

In conventional mills, the lower back-up roll is generally rolled out of stand on fixed rails and the upper back-up roll is removed solely after extracting the working rolls and by using relatively complex devices whose implementation is rather lengthy.

Thanks to the invention, conversely, since the upper back-up roll 3 rests on the stand 1 at constant and perfectly determined level, this roll can be removed using permanently fixed devices.

Indeed, as the upper supporting blocks 4a, 4b are placed at a set level whatever the diameters of the various rolls, it is possible to make them slide or run on fixed rails 8 mounted on the upper section of the stand 1, at the requested level. In the same way, the lower back-up roll 3' is rolled out on rails 8' provided in the foundations of the roll stand. Complex disassembly systems, which were necessary in the past, can be done away with, at least for the upper back-up roll.

On FIG. 2, for instance, which shows a quarto arrangement using two back-up rolls 3, 3' with rotary casing, the said rolls are in disassembly position, before clamping the working rolls 2, 2'.

It appears thus quite possible to remove the stand, for maintenance or replacement purposes, the whole back-up roll 3 with the rotary casing 31, the centre shaft 34 and its supporting blocks 4a, 4b. The roll 3 moves parallel to the axis 30 while passing through the cavity 61 of the standard 11a placed on the displacement side, the supporting blocks 4a, 4b being fitted with rollers 81 running on disassembly rails 8 fitted with guiding and wear parts 82.

The rails are installed in the roll stand 1 and are extended, outside, by roll supporting devices, not represented, and which can vary according to the installations. Moreover, jacks or other means enabling to impart the movement necessary to extract the back-up rolls 3, 3' from the roll stand, can be contemplated. Removable rail sections may provide the connections inside the stand.

As shown on FIG. 1, if the roll 3 is extracted by moving to the left, it goes through the 11 via the cavity 61a. In the assembly represented on FIGS. 1 and 2, the supporting block 4a placed on the removing side and, consequently, the corresponding cavity 61a are delineated by cylindrical surfaces, respectively 41 and 63, whose radius is slightly larger than that of the external face 33 of the casing 31, in order to leave, between the face 32 of the roll and the surface 63 of the cavity, a minimum play (i) sufficient to avoid any risk of deteriorating the tubular casing when moving the roll.

On the other hand, the diameter of the supporting block 4b provided on the site opposite to the displacement direction, as well as the diameter of the internal face 63b of the cavity provided in the standard 11b do not exceed the diameter of the external face 33 of the tubular casing 31 in order to go through the cavity 61a of the opposite standard with any risk of deteriorating the back-up surfaces 63a of the cavity 61a and 41b of the supporting block 4b.

Moreover, the height of each supporting block 4 must be delineated downwards, for instance, at a plane face 46 parallel to the passage plane of the band M, in order not to interfere with the hydraulic blocks 14a, 14b between are guided the chocks of the working roll 2.

The cavities 61 and the supporting blocks 4 can be delineated by cylindrical circular surfaces as shown on FIG. 2. It results however that, for replacement purposes, the tubular casing 31 must, in a first stage, have been placed in a set position for which its axis 30 coincides with the axis 30' of the external face 41 of the supporting block 4 and of the surface 63 of the cavity 61.

To remedy this shortcoming, the cavities 61 and the supporting blocks 4 may advantageously be oblong in shape, delineated upwards and downwards, by semi-cylindrical surfaces whose axes are at a distance corresponding at least to the offset of the axis of the casing 31 between the clamping position, in contact with the working roll, and the replacement position for which the rolls are moved apart. This arrangement which will be described in greater detail below, with reference to FIG. 4, enables removal and replacement of the roll 3 without needing to bring the tubular casing 31 back into a given position.

Everything which has been divulged also applies to the lower back-up roll 3' and to its bearing blocks 4'a, 4'b which can be housed in cavities 61'a, 61'b of both standards, respectively, 11a and 11b of the stand 1, whereas the lower back-up roll 3' is removed and replaced in the same way as the upper back-up roll 3.

To enable all level adjustments, It is preferable that both back-up rolls, respectively upper 3 and lower 3' back-up rolls, are of the rotary casing type, as shown on FIG. 2. However, if the casing 31 can be moved radially far enough with respect to the centre shaft 34 to perform the level adjustments which are necessary for all the rolls, it is possible to use a single roll with rotary casing, whereas the second lower back-up roll 3' is a full roll carried by two chocks 4'a, 4'b. As usual, the said chocks may rest at the bottom of the standards 11a, 11b on variable thickness shims, enabling to adjust the level of the roll 3' and of the passing line.

However, as already stated, the lower chocks 4'a, 4'b can also be housed, like the upper supporting blocks 4a, 4b, in cavities 61'a, 61'b of both standards 11a, 11b, according to the arrangement represented on FIG. 1.

The lower back-up roll can be mounted on shims or eccentric parts enabling to move the roll between a low removal position and a high position corresponding to the level of the passing line.

The thickness of the gap 15 is determined by adjusting the level of the upper working roll 2, which must come into contact with the upper back-up roll 3. The level of the latter depends therefore on the diameter of the working roll 2.

As regards the working rolls, the known replacement systems of these rolls can be used.

In a roll stand according to the invention, it is thus possible to install permanently the removal system of the back-up rolls, which also enables if needed, to change the upper roll 3 exclusively, whereas disassembly can unfurl without having to remove the working rolls or the intermediate rolls In a sexto stand. Another advantage of the invention therefore consists in shortening the downtimes of the installation for changing worn or damaged rolls.

The level adjustments of the upper back-up roll 3 are carried out, according to the invention, by moving the rotary casing 31 using the set of pads 36 and of the jacks 75 acting in opposite directions.

FIG. 1 represents schematically, and for simple exemplification purposes, a hydraulic control system 9 of the radial position of the back-up pads 36 of the tubular casing 31.

The radial position of each pad 36a, 36b . . . is controlled by at least one hydraulic jack 38a, 38b . . . which is power supplied individually, from a hydraulic stations 91, by a circuit 92a, 92b . . . , on which is mounted a servo valve 93a, 94b . . . .

The position or the pressure of each jack 38a, 38b can be controlled by the servo valve connected 93a, 93b . . . according to the data given over an individual line 94a, 94b . . . by a computation unit 94 with several information inputs 95.

Position measurement signals transmitted by measuring instruments 96a, 96b . . . are applied to a set of inputs 95a allocated respectively to each of the pads 36a, 36b . . . .

A set value constituting a global position reference of the casing 31 is displayed on a second input 95b of the computation unit 94.

This set value can be displayed manually or be prepared by a sequence S management automaton which, taking into account various parameters such as the characteristics of the stand and the diameters of the rolls, enables to determine the levels of the casing 31, respectively in the disassembly position and the rolling position.

A thickness correction signal transmitted by a thickness gauge of the product associated with the mill, is applied to another input 95c.

Besides, to ensure flatness correction, the computation unit 94 also comprises an input 95d for measurement signals transmitted by a flatness measuring device 97', for instance a roller fitted with sensors. From this information, the computation unit 94 transmits to the servo valves 93a, 93b . . . individual orders for correcting the pressures applied to each of the pads 36, in order to modify the load distribution and correct the defects measured.

These regulation operations are initiated or not by control software, symbolised on each line of the diagram, by switches 98 and which enables, for instance, to combine the individual flatness regulation orders with the global command, which determines the average level, requested for the back-up generating line.

We are now going to describe the removal process of the rolls. For simplification purposes, in this example of application, we assume that the rolls are replaced after stopping the mill, which means that the product is not engaged between the working rolls any longer.

To replace the working rolls, the former must first of all be moved away from the corresponding back-up rolls.

The lower back-up roll 3' is first of all lowered, for instance using its adjustment shims so that its chocks 4' rest on fixed rails 8' via rollers 81'.

The lower working roll 2' is held by its bending jacks at a top level and is therefore moved away from the back-up roll 3'. Since the metal band is not engaged, the upper working roll 2 rests on the lower working roll 2'. The rotary casing 31 of the upper back-up roll 3 is then lifted using jacks 75 in order to move it away from the upper working roll 2.

Using the bending jacks, the level of both working rolls 2, 2' is then raised, to place them in removal position at the level of rails which are not represented, on which run the chocks of the lower working roll 2' for removing both worn rolls.

A pair of new working rolls is then inserted into the stand, by displacement in reverse direction on rails.

The level of the lower back-up roll 3' is adjusted, for example using shims, to determine the passing line.

The lower working roll 2' is brought down in contact with the lower back-up roll 3' and using the bending jacks, the level of the upper working roll 2 is adjusted in relation to the gap 15 to be provided. While acting simultaneously on the set of adjustment pads 38 of the pads 36, the rotary casing 31 is thus lowered to bring the latter back into contact with the upper working roll 2.

To replace the working rolls, the rotary casing 31 must first of all have been moved away from the working roll 2 by a height sufficient to release both rolls 2, 2'.

Consequently, as shown on FIG. 4, if the upper back-up roll 3 should be removed through the cavity 61*a* without repositioning the casing 31 at a later stage, the upper area of the rounded face 41 of the bearing block 4 and of the corresponding face 63 of the cavity 61 must be centred on an axis 60 offset to the top of the separation height, with respect to the working level of the axis 30 of the casing 31 for which the latter is in contact with the working roll 2.

However, this level may change in relation to the diameter of the working rolls and this explains why the lower section 41' of the internal face of the bearing block 4 and of the internal face 63 of the cavity 61 are also moved out of centre downwards. Thus, it is possible to remove the back-up roll 3 in the positions of the casing 31.

The chocks 4' of the lower back-up roll 3' and the corresponding cavities 61' of the standards 11 are executed similarly, as indicated on FIG. 2, at least on the removal side.

Obviously, the rotary casing roll 3 that is used contains all the possibilities of the rolls of this type. Consequently, individual flatness control actions can be exerted on the pads 36, which will simply be superimposed on the general action exerted simultaneously on the set of pads in order to determine the global positioning of the casing 31 enabling to adjust the relative levels of the rolls and the thickness of the gap.

It appears therefore that the stroke of the back-up pads 36 of the casing must allow sufficient displacement of the latter with respect to the fixed shaft, to enable displacements between the clamping position and the away position and to compensate for the diameter variations of the working rolls, while preserving a possibility to adjust the pads 36 individually for flatness correction.

However, as the working rolls are finish-ground several times successively, it may happen that the stroke of the pads becomes insufficient, even when the diameter of the rotary casing roll remains unchanged. Moreover, when the back-up roll 3 must also be replaced with a new roll whose casing has been finish-ground, the diameter difference is added to the variations of the working rolls and may exceed the adjustment possibilities of the back-up pads 36.

It is therefore interesting to keep, besides, a possibility of adjusting the level of the centre shaft 34 with respect to the stand.

Figure 4:
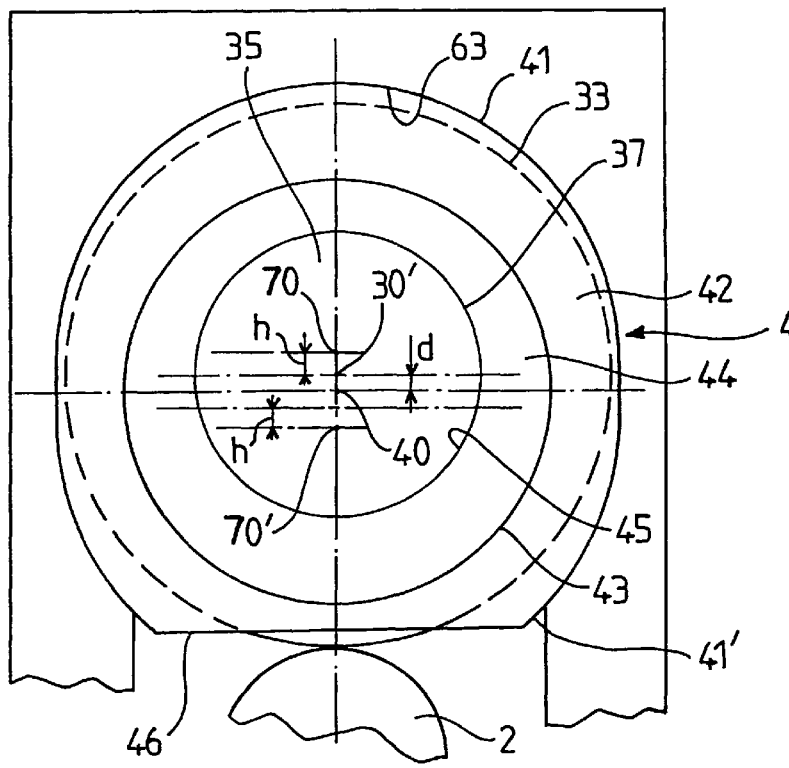
FIG. 4 represents a front view of a supporting part with an eccentric ring.
Figure 5:
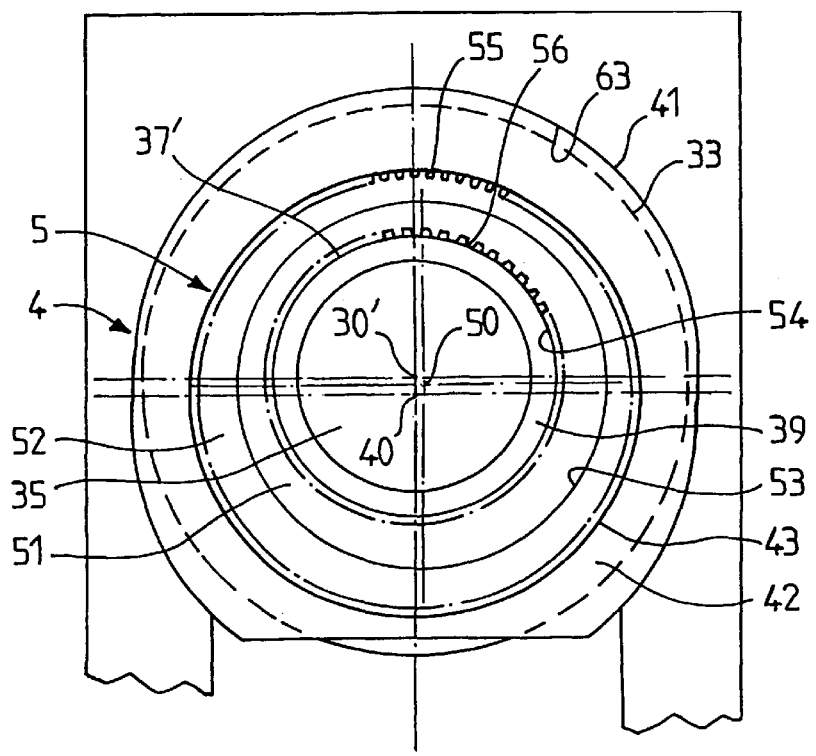
FIG. 5 represents a front view of a supporting part with two eccentric rings.

To this end, a set of variable thickness shims could be used, but the invention also provides an adjustment system, which is particularly interesting, as represented on FIGS. 4 and 5.

Each supporting part 4*a*, 4*b* of the centre shaft 34 comprises an intermediate back-up part 42, consisting of an external bushing-shaped body, with an internal circular face 43, enclosing an eccentric system, interposed between the body 42 and the end head 35 of the centre shaft 34 which is delineated by a lateral cylindrical face 37.

On the example of FIG. 4, the eccentric system features at least one ring 44 with an internal face 45 mounted on the lateral cylindrical face 37 which is centred on an axis 30' and an external face 43 which is centred on an axis 40 and is mounted inside a corresponding internal face of the body 42 of the supporting part 4.

The centres 30', 40' respectively of both circular faces 45, 43 of the ring 44 are offset by a maximum distance (d) (FIG. 4).

Thus, by a 180° rotation of the ring 44, the axis 30' of the end 35 of the centre shaft may adopt two positions which are diametrically opposed to one another, offset by the distance (d), respectively above and below the centre 40 of the internal circular face 43 of the body 42 of the supporting part 4.

Thus, the adjustment range of the level of the tubular casing 31 as well as, consequently, the diameter variation possibility of the rolls is increased by the distance 2*d*.

Obviously, the same assembly with an intermediate ring out of centre can be provided for the lower back-up roll 3', even if it is not of the rotary casing type.

In such a case, the lower back-up roll 3' is carried by two journals 35'*a*, 35'*b* mounted to rotate in hollow supporting parts forming chocks, with interposed eccentric rings, which enable, by 180° rotation, to adjust the axis of the lower roll 3' on two separate levels and thus, to increase the adjustment possibilities.

A number of eccentric rings can be provided, with various eccentric values, for example every 5 millimetres, in order to cover the wear range of the necessary rolls. These rings may be mounted when preparing the rolls in the workshop, while taking into account the diameters of the replacement rolls, which are going to be inserted in the stand.

Continuous adjustment of the axis 30 of the shaft 3 can also be contemplated by acting on the angular position of the eccentric ring 44. However, such an adjustment would also cause a position variation, horizontally, of the axis 30' of the shaft 34 in relation to the axis 30 of the casing 31.

Figure 3:
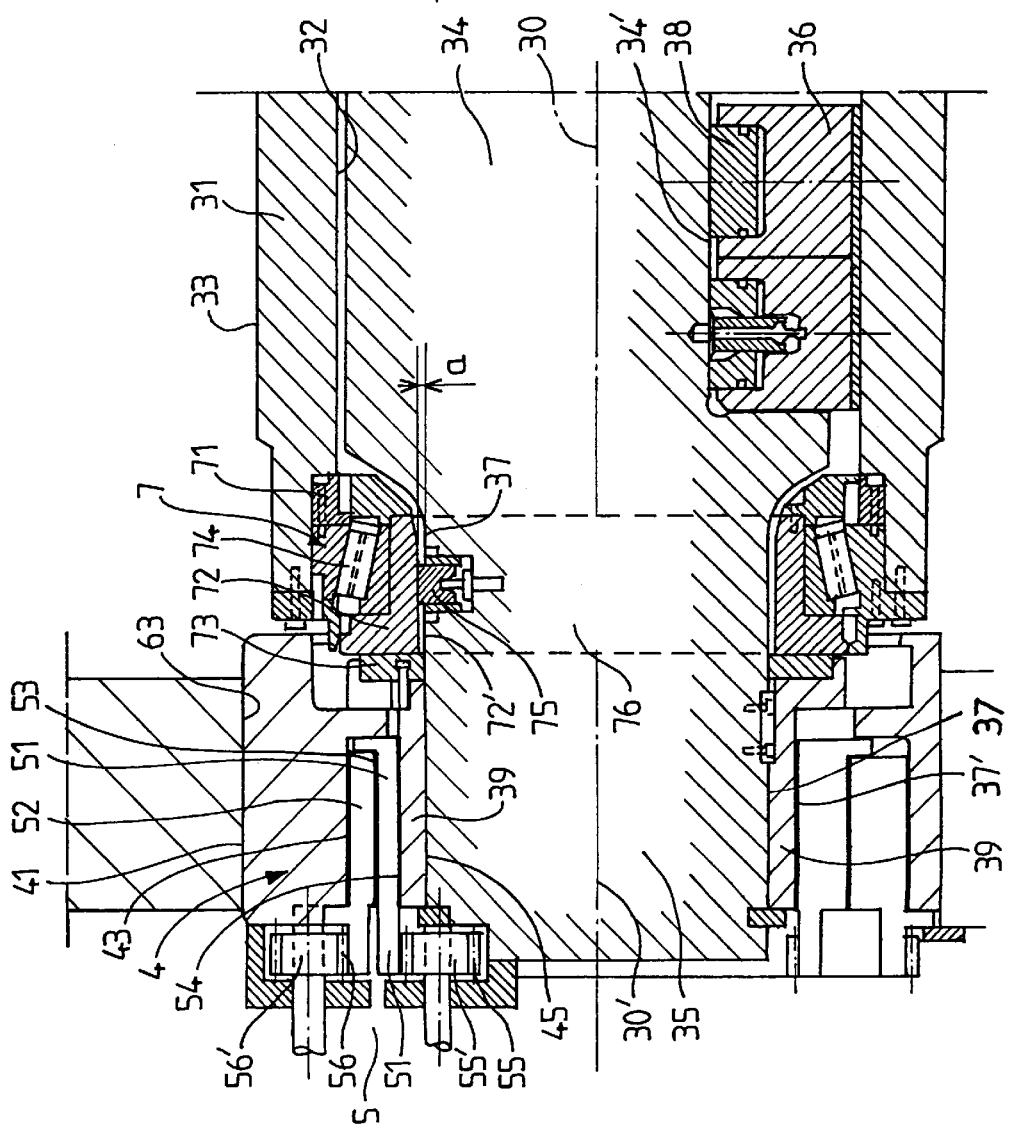
FIG. 3 is a detailed view of a supporting part and of the end of a back-up roll, shown as a plane section going through the roll axis.

To remedy this shortcoming, and according to an improved embodiment of the invention illustrated by FIGS. 3 and 5, each end 35 of the shaft 34 is mounted in a set 5 of two eccentric rings mounted inside one another, respectively an inner ring 51 and an outer ring 52.

The outer ring 52 comprises two circular faces moved out centre, respectively an internal face 53 and an external face enclosed within the internal face 43 of the body 42 of the supporting part 4, centred on the axis 40.

The internal ring 51 comprises, for its own part, two circular faces moved out of centre, respectively an external face enclosed within the internal face 53 of the outer ring 52 and an internal face 54 enclosing a matching circular face 37' provided, preferably, on a bushing 39 mounted on the lateral face 37 of the back-up head 35 of the shaft 34 and, therefore, centred on the axis 30' of the said head.

It is thus possible to adjust individually a vertical and horizontal offset of the axis 30' of the back-up head 35 of the shaft 34 with respect to the axis 40 of the internal face 43 of the supporting block, while adjusting conveniently the relative angular position of both rings 51, 52 in relation to one another, as well as the angular position of the set 5 with respect to the supporting block 4.

In the particular embodiment illustrated on FIG. 5, two rings 51, 52 have been considered, with the same eccentricity (e) between both their faces, respectively external and internal. In the position represented on FIG. 5, the axis 30' of the back-up head 35 of the shaft 34 and the axis 40 of the supporting block 4 are aligned along a same vertical line, whereas the axis 50 of the intermediate face 53 is a medium position, offset laterally.

From this position, it is possible, by rotating both rings in opposite direction, to vary the distance between both axes 30' and 40, while keeping vertical with respect to one another.

Figure 6:
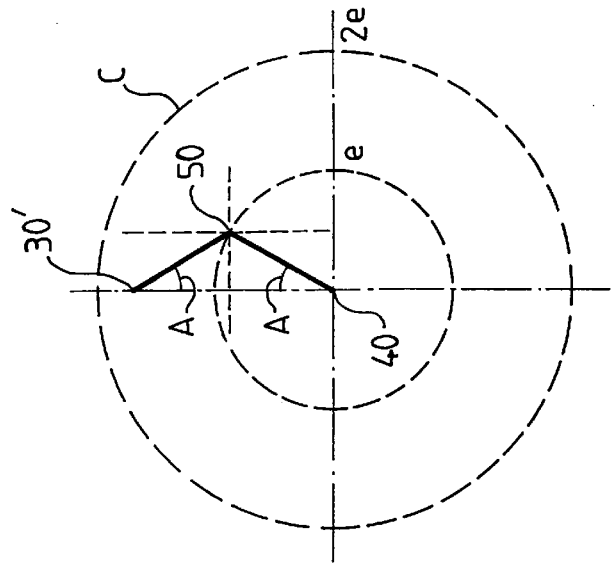
FIG. 6 is an operating diagram of the device of FIG. 5.

Indeed, as shown schematically on FIG. 6, rotation of an angle (A) of the inner ring 51 and of an opposite angle (−A) of the outer ring 52 will lower the axis 30' of the back-up head 35 of the shaft 34, while keeping the said axis 30' vertically to the axis 40 of the supporting block 4, whereas the vertical offset between both theses axes is equal to 2e cos A. For angle A of 90°, both axes 30' and 40 are superimposed.

But the angular positions of both rings 51, 52 can be set to different values with respect to the supporting block 4 and to the shaft 34. It is thus possible, if needed, to adjust the position of the axis 30' of the shaft 34 at any point located within a circle C of radius 2e and centred on the axis 40 of the supporting block 4.

Generally speaking, the installation of the rings 51, 52 and their eccentricities will be suited to the requirements and to the characteristics of the roll stand.

The angular positions of the eccentric rings 51 and 52 can be adjusted in the roll workshop, by using a rotation locking means fitted, for instance, with an index linked to the inner ring 51 immobilised by a removable part on the shaft 3 and, respectively, an index on the outer ring 52 immobilised on the supporting block 4.

In a more perfected embodiment, represented on FIG. 3, the adjustment of both eccentric rings can be motor-driven.

The inner ring 51, which revolves on a protection bushing 39 mounted at the end 35 of the shaft 34, is fitted, on its internal face 54, with a toothed crown 55 into which engages a pinion 55' mounted to rotate on the shaft 34.

In the same way, the outer ring 52 mounted on the internal face 43 of the external body 42 is fitted, on its external face, with a toothed crown 56 into which engages a pinion 56' mounted to rotate on the supporting block 4.

For simplification purposes, the toothed crowns 55, 56 have only been indicated by a sector on FIG. 5.

The pinions 55', 56' are driven into rotation, independently from one another by means, not represented, and connected with position locating means mounted respectively, on the shaft 34 and the supporting block 4.

It is thus possible to adjust remotely the position of the back-up rolls in relation, for instance, to the diameter of new working rolls when replacing them.

As described previously, the usage of two eccentric rings enables to choose the position of the axis 30' of each end 35 of the centre shaft of the back-up roll 3 within a circle C centred on the axis 40 of the end block 4. Once the vertical position has been chosen in relation to the diameter of the rolls installed, it is possible to select a combination of the angular positions of both end rings 51, 52 to obtain a set horizontal offset between the axis of each back-up roll 3, 3' and the axis of the corresponding working roll 2, 2'.

This horizontal offset can, besides, be adjusted differently at both ends 35a, 35b of the shaft 34.

The relative positions of the rolls in the horizontal plane, an adjustment referred to as (<offset>), can be adjusted to avoid any deformation of the contact generating line G, whereas the said generating line shows a tendency to wrap around the back-up roll while causing uncontrolled variations of the roll flattening cumber, which generates instabilities of the rolled product. This phenomenon, known as roll crossing, can thus be corrected, but it is also possible to induce voluntary crossing of the rolls in order to control the flatness of the product.

We also know that the exact value of this <<offset>> acts on horizontal deformation of the working roll subject to the rolling load, which is particularly sensitive to small diameter rolls.

It is thus possible with a roll stand according to the invention and fitted with eccentric ring of the type described previously, to pre-adjust the <<offset>> of the rolls, for instance, in relation to the anticipated rolling load for the product contemplated, in order to control horizontal deformation of the working rolls within requested tolerances.

In the same way, a roll stand according to the invention cold enable to adjust horizontal offsets of the back-up rolls of opposite direction between the supporting blocks 4a, 4b mounted respectively on both standards 11a, 11b of the mill. A device for crossing the rolls would thus be provided, which could be used to vary the roll cumber and control the flatness of the rolled product.

Obviously, the invention is not limited to the details of the embodiments which have just been described for exemplification purposes, whereas variations may be considered in relation to the requirements, without departing from the protection framework defined by the claims.

For example, it is particularly interesting to confer a circular profile to the supporting parts of the back-up roll(s) and to the corresponding cavities whose sizes can also be reduced as far as possible, while allowing for disassembly of the roll. However, another rounded profile, for example, falsely elliptical, should enable, according to the invention, to distribute the pressure applied over the whole width of the crossbeam 16 and in diverging directions scattered round the axes.

On the other hand, the invention may comprise all the improvements and conventional appended devices, which have thus not been described. In particular, a device with articulated clamping claws, arranged between the standards 11 and the supporting blocks 4, enables to avoid, during operation, spurious axial movements which may be caused by axial thrusts induced by the rolling loads.

It should be noted that this axial locking should not impede thickness regulation since the supporting blocks are fixed in operation.

Besides, the removal process which, for simplification purposes, has been described above in the case when the band does not remain engaged between the rolls, can be suited for continuous rolling in which the rolls must be replaced whereas the band remains engaged.

In such a case, the upper working roll is connected to fixed rails, placed at the level requested by the bending jacks. Removable rail sections provide, as is common knowledge, the links with the stand.

On the other hand, the invention has been described in the case of a quarto mill, but can be applied to another type of mill using at least one back-up roll of relatively large diameter with respect to the working rolls, for instance, a mill of sexto or Z-High type.

In the same way, the invention can be applied to the mills in which the working rolls are not carried by chocks but, for example, by balancing forks.

The reference signs inserted after the technical characteristics mentioned in the claims solely aim at facilitating the understanding of the said claims and do not limit their extent in any way.

What is claimed is:

1. A metal band product rolling installation comprising:
   a fixed holding stand (1) having two separate standards (11a, 11b) each forming a closed frame comprising two stiles (12, 12'), an upper crossbeam (16) and a lower crossbeam (16'), and delineating a centre window (6),
   at least two rolls with parallel axes delineating a passage gap (15) for a product (M) following a rolling plane (P1) with the application, between the rolls, of a clamping load for rolling the product (M),
   at least one of the rolls being a back-up roll (3) for imparting a clamping load, the said back-up roll (3) being mounted to rotate round its axis and carried by two opposite end heads (35a, 35b), each mounted in a supporting part (4) resting on a side opposite to the gap (15), on a back-up face (63) of the corresponding crossbeam (16, 16') of each standard (11a, 11b),
   wherein, at least on one side of the rolling plane (P1), the crossbeam (16) of each standard (11a, 11b) is fitted with a back-up face (63) exhibiting, over the whole width of the window (6), a concave rounded profile extending on an angular sector of at least 180° and the supporting part (4) of each end head (35a, 35b) of the back-up roll (3) rests on the said crossbeam (16) via a back-up part (42) delineated by a contact face (41) with a convex rounded profile matching that of the back-up face (63).

2. An installation according to claim 1, comprising, on either side of the rolling plane (P1) at least two rolls, respectively a working roll (2) revolving round a shaft fitted with two opposite journals, carried by chocks inserted between two guiding faces (13) parallel to the clamping plane (P2) going through the axes of the working rolls (2, 2'), and at least one back-up roll (3) of larger diameter than that of the working roll (2), wherein, at least on one side of the rolling plane (P1), the window (6) of each standard (11a, 11b) of the stand (1) comprises, on its end opposite to the rolling plane (P1), a cavity (61) delineated by a rounded face (63) extending on an angular sector of at least 180° and a central part (60) delineated by two parallel sides supporting guiding faces (33) the chocks of the working roll (2).

3. A rolling installation according to one of claims 1 or 2, wherein, at least on one side of the rolling plane (P1), the concave back-up face (63) of the crossbeam (16) and the contact face (41) of the supporting part (4) show a circular profile over a sector of at least 180°.

4. A rolling installation according to claim 1, in which at least one back-up roll (3) can be removed from the stand (1) by moving parallel to its axis (30), wherein a first standard (11a) of the stand (1) is fitted with a first cavity (61a) to accommodate a first supporting part (4a) of the roll (3), which goes through the said first standard (11a) completely, and in that the said first cavity (61a) as well as the said first supporting part (4a) exhibit, in all directions, greater sizes than those of the back-up roll (3), in order to enable removal of the back-up roll at least in one position of the back-up roll with respect to the stand (1) by axial displacement of the said roll (3) on the side of the said first standard (11a), by going through the said first cavity (61a) whose sizes are greater.

5. An installation according to claim 1, wherein at least one back-up roll (3) is of the rotary casing type comprising a centre shaft (34) constituting an oblong supporting beam with two opposite end heads (35a, 35b) each mounted in a supporting part (4a, 4b), a tubular casing (31) mounted to rotate round the centre shaft (34) and exhibiting a cylindrical internal face (32) and a cylindrical external face (33), centred on a rotation axis (30), a number of back-up pads (36) arranged beside one another along the centre shaft (34) between the centre shaft and the internal face (32) of the casing, and means (38) for individual adjustment of the radial position of each back-up pad (36) with respect to the centre shaft (34), and in that the supporting parts (4a, 4b) of both end heads (35a, 35b) of the centre shaft (34) are each accommodated in a cavity (61) provided in a corresponding end of the window (6) of the corresponding standard (11a, 11b) and delineated by a concave back-up face (63), whereas the said supporting part (4a, 4b) is surrounded, at least on the side opposite to the gap (15), by a back-up part (42) delineated by a convex contact face (41) matching that of the back-up face (63) of the cavity (61).

6. A rolling installation according to claim 1, wherein each supporting part (4) of an end head (35a, 35b) of the roll (3) is fitted with means (44, 5) for adjustment of the level of the said end head (35a, 35b) with respect to the back-up face (63) of the crossbeam (16).

7. A rolling installation according to claim 4, wherein a second supporting part (4b) of the roll (3) opposite to the removal side and the corresponding second cavity (61b) of a second standard (11b) of the stand (1) exhibit, in all directions, sizes at least equal to those of the roll (3), whereas the roll (3) is also extractable as a whole, with both its supporting parts (4a, 4b), through the first cavity (61a).

8. A rolling installation according to claim 7, wherein the back-up face (63a) of the first cavity (61a) of a first standard (11a) placed on the removal side and the contact face (41a) of the corresponding supporting part (4a) exhibit, over an angular sector of at least 180° directed to the side opposite to the gap, a circular profile whose diameter is slightly greater than that of the back-up roll (3) and in that the back-up face (63b) of the second cavity (61b) of the second standard (11b) placed on the opposite side as well as the contact face (41b) of the corresponding supporting part (4b) exhibit, at least on the side opposite to the gap (15), a circular profile whose diameter should not exceed that of the roll (3).

9. A rolling installation according to claim 8, wherein the level of each end head (35a, 35b) of the roll (3) is adjustable between two positions separated by a vertical distance, whereas each supporting part (4a, 4b) of the roll (3) is delineated by a contact face (41) of oblong shape on its straight section, comprising two opposite semi-circular faces whose centres are separated by a distance enabling the position adjustments, and the corresponding cavities (61a, 61b) of both standards (11a, 11b) are each delineated by a back-up face (63a, 63b) showing, in hollow, an oblong shape matching that of the corresponding supporting part (4a, 4b).

10. A rolling installation according to one of the claims 4 to 8, wherein both supporting parts (4a, 4b) of the end heads (35a, 35b) of the back-up roll (3) are fitted with rollers (81) running on rails (8) fixed on the stand (1) and extending between both stiles (11a, 11b), for removing the roll (3) by making it run over the said rails (8).

11. An installation according to claim 5, wherein a set of means (38) for individual adjustment of the radial position of the pads (36) constitutes a means for applying the clamping load between the rolls, whereas the said pads (36) are controlled simultaneously, in order to adjust and to maintain the casing (31) at the level requested with respect to the rolling plane (P1).

12. A rolling installation according to claim 11, comprising two working rolls (2, 2') and at least one back-up roll (3) of the rotary casing type, characterised in that said back-up roll (3) comprises means to adjust the distance between the working rolls (2, 2') in relation to the requested gap and means for simultaneous control of the adjustment means (38*a*, 38*b* . . . ) respectively associated with the pads (36*a*, 36*b* . . . ) for bringing the rotary casing (31) in contact with the related working roll (2) and for applying the clamping load.

13. A rolling installation according to claim 11, in which the radial position of each pad (36*a*, 36*b* . . . ) with respect to the shaft (34) is adjusted by at least one hydraulic jack (38*a*, 38*b* . . . ) connected to a power supply system (9) comprising a hydraulic station (91), individual circuits (92*a*, 92*b* . . . ) for supplying each pad (3*a*, 36*b* . . . ), each fitted with a servo valve (93*a*, 93*b* . . . ) and a regulation assembly (90) for the pressures applied to each pad (36*a*, 36*b* . . . ) in relation to the radial position detected by an individual position measurement instrument (96*a*, 96*b* . . . ) connected to each pad (36*a*, 36*b* . . . ), wherein the regulation assembly (90) comprises a computation unit (94) with at least one series (95*a*) of position measurement signal inputs transmitted by the individual measuring instruments (96*a*, 96*b* . . . ), an input (95*b*) of a set signal corresponding to a global reference position of the rotary casing (31), an input (95*c*) for a thickness correction signal and a series of inputs (95*d*) for individual flatness regulation signals, determining a correction of the pressure applied to each pad (36*a*, 36*b* . . . ).

14. An installation according to one of the claims 5 to 13, characterised in that said installation comprises two means for adjustment of the relative level of the back-up roll (3) with rotary casing with respect to the working roll (2), respectively a means for adjustment of the global position of the rotary casing (31) with respect to the centre shaft (4) and a means (44, 5) for position adjustment of both end heads (35*a*, 35*b*) of the roll (3), respectively, with respect to the fixed back-up faces (63*a*, 63*b*) of both standards (11*a*, 11*b*) of the stand (1).

15. A rolling installation according to claim 6, wherein the adjustment means comprise at least one eccentric ring (44) interposed between an annular back-up part (42) of the supporting part (4) and the end head (35) of the roll (3), whereas the said ring (44) exhibits two circular faces moved out of centre with respect to one another, respectively an internal face (45) mounted on a cylindrical back-up face (37, 37') provided on the end head (35) of the roll (3) and an external face mounted inside a cylindrical bore (43) delineating inwards the said angular back-up part (42), whereas the angular position of the said ring (44) with respect to the supporting part (4) can be modified by rotation of the ring (44) in order to adjust the level of the axis (30') of the cylindrical back-up face (37, 37') of the end head (35) of the roll (3) with respect to the supporting part (4).

16. A rolling installation according to claim 6, wherein the adjustment means comprise an adjustment assembly (5) interposed between an annular back-up part (42) of the supporting part (4) and the end head (35) of the roll (3), whereas the said assembly (5) comprises two eccentric rings mounted inside one another, and exhibiting, each, two circular faces moved out of centre in relation to one another, respectively an internal ring (51) mounted on the end head (35) and an external ring (52) mounted inside a bore (43) delineating inwards the annular back-up section (42) of the supporting part (4), whereas the relative angular positions of the said rings in relation to one another and with respect to the supporting part (4) can be modified.

17. A rolling installation according to claim 16, wherein the adjustment of the respective angular positions of both rings (51, 52) with respect to the supporting part (4) determines, while combining the eccentricities, the displacement of the axis (30') of the cylindrical back-up face (37) of the end head (35) inside a circle centred on the axis (40) of the bore (43) and of a radius equal to the sum of the maximum eccentricities of both rings.

* * * * *